BEST AVAILABLE COPY

April 26, 1927.

J. J. CAVETT

SEALED VALVE

Re. 16,604

Original Filed Sept. 28, 1922

Inventor
John J. Cavett.

Geo. E. Thackray
Attorney

Reissued Apr. 26, 1927. Re. 16,604

UNITED STATES PATENT OFFICE.

JOHN J. CAVETT, OF WOODLAWN, PENNSYLVANIA, ASSIGNOR TO THE KOPPERS COMPANY, A CORPORATION OF DELAWARE.

SEALED VALVE.

Original No. 1,540,513, dated June 2, 1925, Serial No. 591,193, filed September 28, 1922. Application for reissue filed February 21, 1927. Serial No. 170,020.

My invention relates generally to a valve which is applicable for use in connection with branch pipes or feeders which discharge gases into a main pipe and consists of a particular arrangement and construction for sealing such a valve, while at the same time allowing water or other liquids to pass by it, while maintaining the gas seal when closed.

One of the applications of this valve is to each of the goose necks or rising pipes, one of which is connected with each coke oven of a battery comprising a number of coke ovens and these pipes discharge the gas from each coke oven into a general collecting main which is ordinarily located near or at the top of the battery of ovens. After the oven has been charged with coal or other materials and while the various other openings are closed during the distilling period, my valve is normally open allowing the distillate gases from the oven to be discharged into the gas collecting main.

At intervals of 18 hours, more or less, the oven has to be recharged with coal after the coke has been discharged therefrom and at this time the oven doors are open and the charging hole is also open, so that during this period my valve is closed so as to prevent access of air, etc., into the collecting main.

My valve may be made of conical form with an upturned annular lip around its lower portion so that between this lip and the body of the valve an annular space is provided of approximately triangular section with rounded corners. A stream or spray of ammonia liquor or water, is discharged into the goose neck of the rising pipe and is discharged thence into and past the valve into the collecting main, for the purpose of absorbing the ammonia or other by-products.

Some tar may also be deposited and a little of this may also remain in the annular space of my valve. The liquid thus discharged into or condensed from the gases in the rising pipe or goose neck thereof will keep the annular space in my valve sealed as the upturned lip of the valve is of such a depth as to maintain the necessary depth of liquid therein and this height is greater than the gas pressure in order to maintain the closure.

My valve is seated against a seat ring and this ring may have notches or openings of any form provided in or near its lower edge so that when closed the liquids discharged into the valve may still flow past the valve and maintain the gas seal, while at the same time permitting the passing of the liquids.

My valve when closed is therefore gas tight, but at the same time permits liquids to pass. The notches or openings in my valve seat may be of any form desired and my valve may be either conical or of any other shape and the cross-sections of the annular space may be triangular, rectangular, or of any other contour as may be readily understood by any one skilled in this art.

The valve may be of disk shape or it may be conical to aid in its seating, or it may be rectangular or of any other shape, the essential feature being the upturned edge to retain liquid.

Having thus given a general description of my invention, I will now, in order to make the matter more clear, refer to the annexed sheet of drawings, which form part of this specification, and in which like characters refer to like parts:

Figure 1:
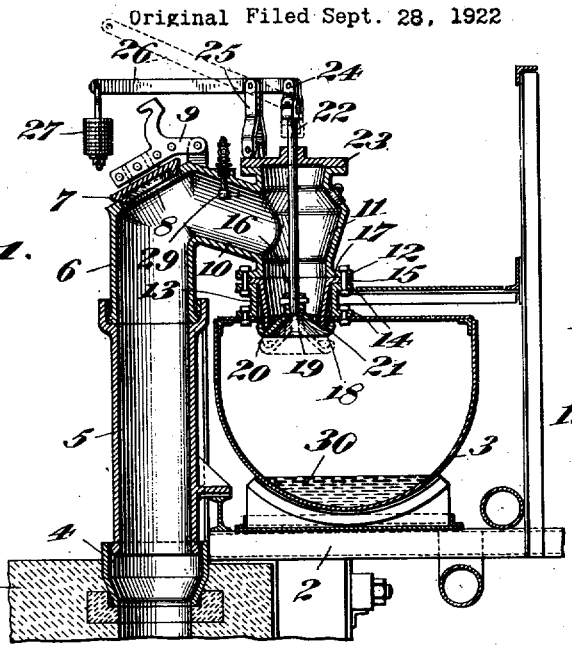
Figure 1 is a vertical sectional elevation of a rising pipe connection on the top of a battery of coke ovens, between one of the coke ovens and the collecting main.
Figure 6:
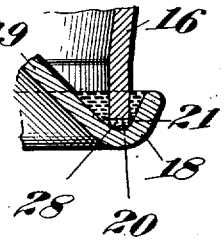
Fig. 6 is a detail view drawn on a larger scale illustrating the manner of forming the liquid seal between the valve seat and the valve.
Figure 2:
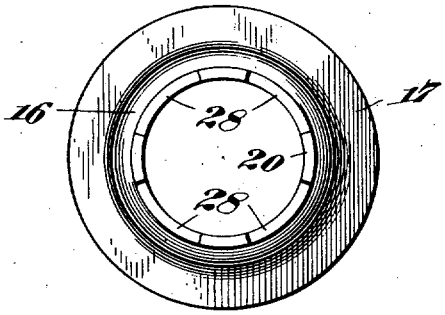
Fig. 2 is a bottom plan view of the valve seat.
Figure 3:
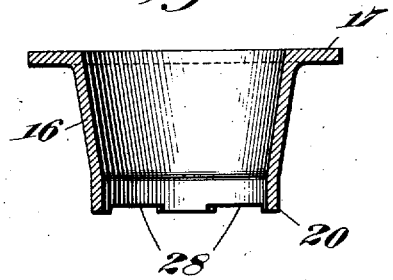
Fig. 3 is a vertical section through the valve seat.
Figure 5:
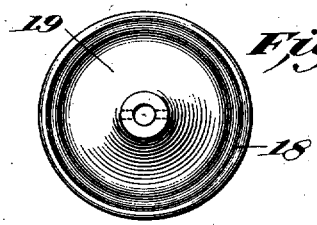
Fig. 5 is a top plan view of the valve.
Figure 4:
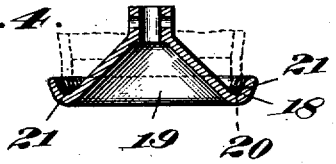
Fig. 4 is a vertical section through the valve.

Referring now to the characters of references on the drawings:—

1 is the top portion of a coke oven; 2 is part of the frame work or bracket which supports the collecting main 3; 4 is a base ring seated in the top of the coke oven and into which the stand pipe 5 is connected as illustrated.

Connected to the upper part of the stand pipe 5, is the goose neck pipe 6, and this is provided with the usual swinging door or cap 7 to permit access to the opening 8 therein; this cap being provided with a hinge 9 as illustrated. The goose neck is provided with a downwardly inclined portion 10, which is integrally connected with the valve casing 11, the lower portion of which has an annular flange 12 as illustrated. An annular collar 13 is secured to the upper portion of the collecting main 3 and to the flange 12 by means of its flanges 14, by the bolts 15. Between these two portions is inserted the flange 17 of the valve seat casing 16, and thereby it is secured in place. The valve 19 is illustrated as of conical form and provided with an upturned edge 18 forming an annular space of approximately triangular section between said edge and the body of the valve as illustrated. The valve seat casing 16 has the valve seat 20 on its lower edge and the sealing fluid in the annular space of the valve is 21. The valve 19 is provided with a supporting rod or stem 22 secured thereto, the upper end of which passes through the cover 23 on the top of the valve casing and this rod has a clevis member 24 at its upper end preferably formed integrally therewith. To the clevis is pivoted a lever 26, which is rotatably mounted on the support 25, and provided with a removable counter-weight 27 at its outer end.

The valve seat portion 16 is provided with notches 28, in the bottom edge or seat thereof, which will allow liquids to pass by said valve when closed and the height of liquids retained by the upturned edge of the valve 18, is such as to overcome the gas pressure and prevent the passage of gas when the valve is closed, while allowing the spray or liquids to pass through the notches 28, thereby discharging over the upturned edge of the valve into the collecting main. The water, ammonia liquor, etc., is discharged into the goose neck and thence into the collecting main through the spray pipe 29, while 30 is the liquid in the bottom of the collecting main.

When the parts are in position illustrated by the full lines in Figure 1, the valve is closed and consequently the doors and charging openings for the coke oven may be opened for charging, etc., and no air or other gases can be discharged from the oven into the collecting main or vice versa.

After the oven is charged, the openings and doors thereof are closed and the distillation of gas begins, the weight 27 is removed from lever 26 and the valve 19 is allowed to drop by gravity to the position shown by dotted lines in Figure 1, whereby gases are discharged into the collecting main and over the valve, and the water or ammonia liquor, etc., from the spray pipe 29, is discharged directly into the collecting main.

When the valve is closed the liquid passes through the notches in the valve seat and thence through the annular space in the valve and over the valve edge into the collecting main.

Although I have shown and described my invenion in considerable detail, I do not wish to be limited to the exact and specific details thereof, as shown and described, but may use such modifications in, substitutions for, or equivalents thereof as are embraced within the scope of my invention, or as pointed out in the claims.

Having thus described my invention, what I claim and desire to secure by Letters Patent is:—

1. A valve having an up-turned edge portion adapted to retain liquid, and a seat member having openings in its lower end against which end said valve is adapted to rest, thereby allowing liquid to pass, while providing a gas seal.

2. A valve having an up-turned edge adapted to retain liquid, a valve seat adapted to cooperate therewith having notches to allow the discharge of liquid therethrough when the valve is seated, while at the same time maintaining a gas seal.

3. A valve having an approximately conical body portion with an up-turned lower edge, thus providing a continuous annular space between the edge and the body, a valve seat member adapted to contact at its lower end with said valve between the body portion and said up-turned edge and provided with openings in its lower end, and means for supplying liquid to the valve, whereby the valve is adapted to be sealed against the passage of gas while permitting liquid to pass.

4. A valve having an approximately conical body portion with an up-turned edge, thus providing a continuous annular space between the same and the body, a notched valve seat adapted to contact with said valve between the body portion and the up-turned edge thereof, and means for supplying liquid to the valve, whereby the valve is adapted to be gas sealed when seated while allowing liquid to pass.

5. A valve having an up-turned edge portion adapted to retain liquid, a valve seat adapted to cooperate therewith, means for supplying liquid to said valve, a lever connected with the valve and provided with a removable weight adapted to temporarily hold the valve in closed position, said valve being adapted to be held open by its own weight when said removable weight is removed.

6. A valve comprising a conical body portion with an up-turned edge, thus providing a continuous annular space between the edge and body, a valve seat adapted to contact with said valve between the body portion and said up-turned edge, said seat having notches in its contact edge, means for supplying liquid to the valve, whereby it is adapt ed to be sealed against the passage of gas while permitting liquid to pass, a valve stem secured to said valve, a pivoted lever connected to said stem and a weight adapted to be put on or removed from the other end of said lever, whereby the valve may be temporarily held closed by said weight or held open by its own weight.

7. A valve having an up-turned edge portion adapted to retain a liquid, and a seat member adapted to have its lower end submerged in said liquid with a free space between said member and said portion, and means for supplying liquid to the valve, whereby the valve is adapted to be sealed against the passage of gas while permitting liquid to pass.

8. In an offtake for a carbonization chamber in combination: a discharge pipe provided with a valve seat member; a movable valve member for coacting therewith; one of said members being provided with a liquid containing means and the other of said members being adapted to project into said liquid with a free space between it and the other member to effect a liquid seal to close said valve against the flow of gas while allowing the liquid to pass; means for supplying liquid to said valve; and means for separating said members to permit flow of the gas.

In testimony whereof, I have hereunto set my hand.

JOHN J. CAVETT.